United States Patent
Dvorkis et al.

(10) Patent No.: US 6,491,222 B1
(45) Date of Patent: *Dec. 10, 2002

(54) OPTICAL PATH DESIGN FOR SCANNING ASSEMBLY IN COMPACT BAR CODE READERS

(75) Inventors: Paul Dvorkis, East Setauket, NY (US); Edward Barkan, Miller Place, NY (US)

(73) Assignee: Symbol Technologies, Inc., Holtsville, NY (US)

(*) Notice: Subject to any disclaimer, the term of this patent is extended or adjusted under 35 U.S.C. 154(b) by 60 days.

(21) Appl. No.: 09/223,482

(22) Filed: Dec. 30, 1998

Related U.S. Application Data

(63) Continuation-in-part of application No. 09/048,418, filed on Mar. 26, 1998, now Pat. No. 6,114,712, which is a continuation-in-part of application No. 08/727,944, filed on Oct. 9, 1996, now abandoned.

(51) Int. Cl.[7] .................................................. G06K 7/10
(52) U.S. Cl. ................................ 235/462.01; 235/462.43
(58) Field of Search ............................. 235/454, 462.01, 235/462.32, 462.36, 462.37, 462.43, 462.38, 472.01; 359/213, 216

(56) References Cited

U.S. PATENT DOCUMENTS

| | | | | |
|---|---|---|---|---|
| 3,988,573 A | * | 10/1976 | Hayosh et al. ............... | 359/216 |
| 4,488,679 A | * | 12/1984 | Bockholt et al. ............. | 235/469 |
| 4,800,257 A | * | 1/1989 | Johner ................ | 235/472.01 X |
| 4,962,980 A | * | 10/1990 | Knowles ..................... | 359/213 |
| 4,983,818 A | * | 1/1991 | Knowles ............. | 235/462.37 X |
| 5,028,770 A | * | 7/1991 | Miyazaki et al. ....... | 235/462.36 |
| 5,200,597 A | * | 4/1993 | Eastman et al. ............. | 235/455 |
| 5,214,270 A | * | 5/1993 | Rando .................... | 235/462.36 |
| 5,392,150 A | * | 2/1995 | Inagaki et al. ....... | 235/462.32 X |
| 5,475,208 A | * | 12/1995 | Marom ............... | 235/462.36 X |
| 5,484,995 A | * | 1/1996 | Scofield et al. ......... | 235/462.37 |
| 5,689,102 A | * | 11/1997 | Schonenberg et al. . | 235/462.38 |
| 5,764,398 A | | 6/1998 | Hayakawa | |
| 5,783,813 A | | 7/1998 | Metlitsky et al. | |
| 5,886,332 A | * | 3/1999 | Plesko ..................... | 235/472.01 |
| 5,979,767 A | * | 11/1999 | Schonenberg et al. . | 235/462.35 |
| 6,053,409 A | * | 4/2000 | Brobst et al. .......... | 235/462.36 |
| 6,098,877 A | * | 8/2000 | Barkan et al. ......... | 235/462.25 |
| 6,260,763 B1 | * | 7/2001 | Svetal ................... | 235/454 X |
| 6,283,372 B1 | * | 9/2001 | Li .......................... | 235/462.32 |

FOREIGN PATENT DOCUMENTS

| | | |
|---|---|---|
| EP | 0 669 592 A1 | 2/1995 |
| EP | 0 730 241 A2 | 9/1996 |
| JP | 2000-194792 A * | 7/2000 |
| WO | WO 90/08364 | 7/1990 |

* cited by examiner

*Primary Examiner*—Karl D. Frech
*Assistant Examiner*—Jared J. Fureman
(74) *Attorney, Agent, or Firm*—Kirschstein, et al.

(57) ABSTRACT

A retroreflective optical scan module, for example in a bar code reader having a window, including a light source for directing a light beam to a symbol to be read, and an optical assembly including a light collecting portion which collects and redirects the light along an optical path to a sensor, wherein the optical axis of the light collecting portion is displaced from that of the emitted light beam so that emitted light partially reflected by the window of the reader does not illuminate the sensor.

14 Claims, 13 Drawing Sheets

OPTICAL PATH DESIGN FOR SCANNING ASSEMBLY IN COMPACT BAR CODE READERS

RELATED APPLICATIONS

The present application is a continuation-in-part of U.S. application Ser. No. 09/048,418 filed Mar. 26, 1998, now U.S. Pat. No. 6,114,712, which is a continuation-in-part of Ser. No. 08/727,944 filed Oct. 9, 1996, now abandoned both applications which are hereby incorporated by reference.

BACKGROUND OF THE INVENTION

1. Field of the Invention

The field of the invention relates to electro-optical readers or scanning systems, such as bar code symbol readers, and more particularly to the optical path design in a scanning module for use in applications requiring particularly compact bar code readers.

2. Description of the Related Art

Electro-optical readers, such as bar code symbol readers, are now very common. Typically, a bar code symbol comprises one or more rows of light and dark regions, typically in the form of rectangle. The widths of the dark regions, i.e., the bars and/or the widths of the light regions, i.e., the spaces, between the bars encode information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248 which are owned by the assignee of the instant invention and are incorporated by reference herein have generally been designed to read indicia having parts of different light reflectivity, i.e., bar code symbols, particularly of the Universal Product Code (UPC) type, at a certain working range or reading distance from a hand-held or stationary scanner.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted. All of the above-mentioned U.S. Patents are incorporated herein by reference.

In electro-optical scanners of the type discussed above, the "scan engine" including the laser source, the optics, the mirror structure, the drive to oscillate the mirror structure, the photodetector, and the associated signal processing and decoding circuitry all add size and weight to the scanner. In applications involving protracted use, a large heavy hand-held scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Also, a need exists for compact scanners to fit into small compact devices, such as notebooks.

Thus, an ongoing objective of bar code reader development is to miniaturize the reader as much as possible, and a need still exists to further reduce the size and weight of the scan engine and to provide a particularly convenient to use scanner. The mass of the moving components should be as low as possible to minimize the power required to produce the scanning movement.

It is also desirable to modularize the scan engine so that a particular module can be used in a variety of different scanners. A need exists, however, to develop a particularly compact, lightweight module which contains all the necessary scanner components.

SUMMARY OF THE INVENTION

OBJECTS OF THE INVENTION

It is an object of the present invention to reduce the size and weight of components used to produce scanning motion of the light beam, and to collect the reflected light.

A related object is to develop an electro-optical scanning system which is both smaller and lighter in weight.

It is yet a further object to produce a module which may be manufactured conveniently, and at low cost. A related object is to provide a module which may be assembled easily.

FEATURES OF THE INVENTION

Briefly, and in general terms, the present invention provides an optical scan module including a base; a light source supported by the base, for generating and directing a light beam along a first segment of a first optical path to a symbol to be read; an optical assembly including a light-collecting portion for collecting and re-directing the reflected light along a second optical path, having an optical axis that is displaced from said first segment of the first optical path; a scan assembly including a reciprocally oscillatable scan mirror mounted for oscillating movement, and operative for receiving the light beam transmitted on the first segment of the first optical path, and for directing the light beam along a second segment of the first optical path through the window and exteriorly of the housing module; and a sensor supported by the base for detecting the collected reflected light that has been re-directed by the light-collecting portion, and for generating an electrical signal corresponding to the detected light intensity.

According to the invention there is further provided a bar code reader having a housing with a window, including an optical scan module having mounted thereon:

a) a light source for emitting a light beam;
b) a scanning assembly for receiving said light beam and for generating therefrom a scanning beam directed to the bar code symbol to be scanned so that the emitted scanning beam is substantially orthogonal to the window of the reader.

According to the invention there is further provided a small-size optical scan module in the form factor of a substantially rectangular parallelepiped module having dimensions approximately 20.6 mm×14.2 mm×11.4 mm. In the first embodiment, on one of the smaller sides (i.e. preferably a peripheral side 20.6 mm×11.4 mm or possibly also the side 14.2 mm×11.4 mm in dimension), there is mounted thereon a light source for emitting a light beam, a scanning assembly for receiving said light beam and for generating therefrom a scanning beam directed to an indicia to be read, a detector, and collector mirror arranged to received reflected light and to direct it to said detector.

In a second embodiment, in the same form factor, the light source is mounted on a first one of the peripheral sides (i.e. a 10.4 mm×20.6 mm side), the scanning assembly is mounted on a first base side (i.e. the 20.6 mm×14.2 mm side), the collection mirror is mounted on one of the base sides, and the detector mounted on one of the base sides. In such embodiment one or both of the base sides may be formed from a printed circuit board, while the peripheral side on which the light source is mounted forms part of an integral metal or plastic chassis of the module.

In a third embodiment, in the same form factor, the light source is mounted on a first one of the peripheral sides (i.e. a 20.6 mm×14.2 mm side), the scanning assembly is mounted on the second base side (i.e. the other 20.6 mm×14.2 mm side), the collection mirror is mounted on the first or second base side, and the detector mounted on the first or second base. In such embodiment the second base side is formed from a printed circuit.

In the preferred form of the second embodiment, the scanning assembly and the detector are mounted on the same base side, and the collection mirror is mounted on the opposite base side. Such an arrangement allows the components with electrical connections to be mounted on the printed circuit base side, while the critical optical components (the laser and collection mirror) are positioned in an integral chassis which forms the other base side and at least one of the peripheral sides.

In a fourth embodiment, in the same form factor, all the components are mounted on a first one of the base sides (i.e. a 10.4 mm×20.6 mm side), which is formed from a printed circuit board.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

BRIEF DESCRIPTION OF THE DRAWINGS

FIG. 2b is a front view of the scanner of FIG. 2a;

FIG. 2c is a plan view of the scanner of FIG. 2a;

DETAILED DESCRIPTION OF THE PREFERRED EMBODIMENTS

Figure 1:
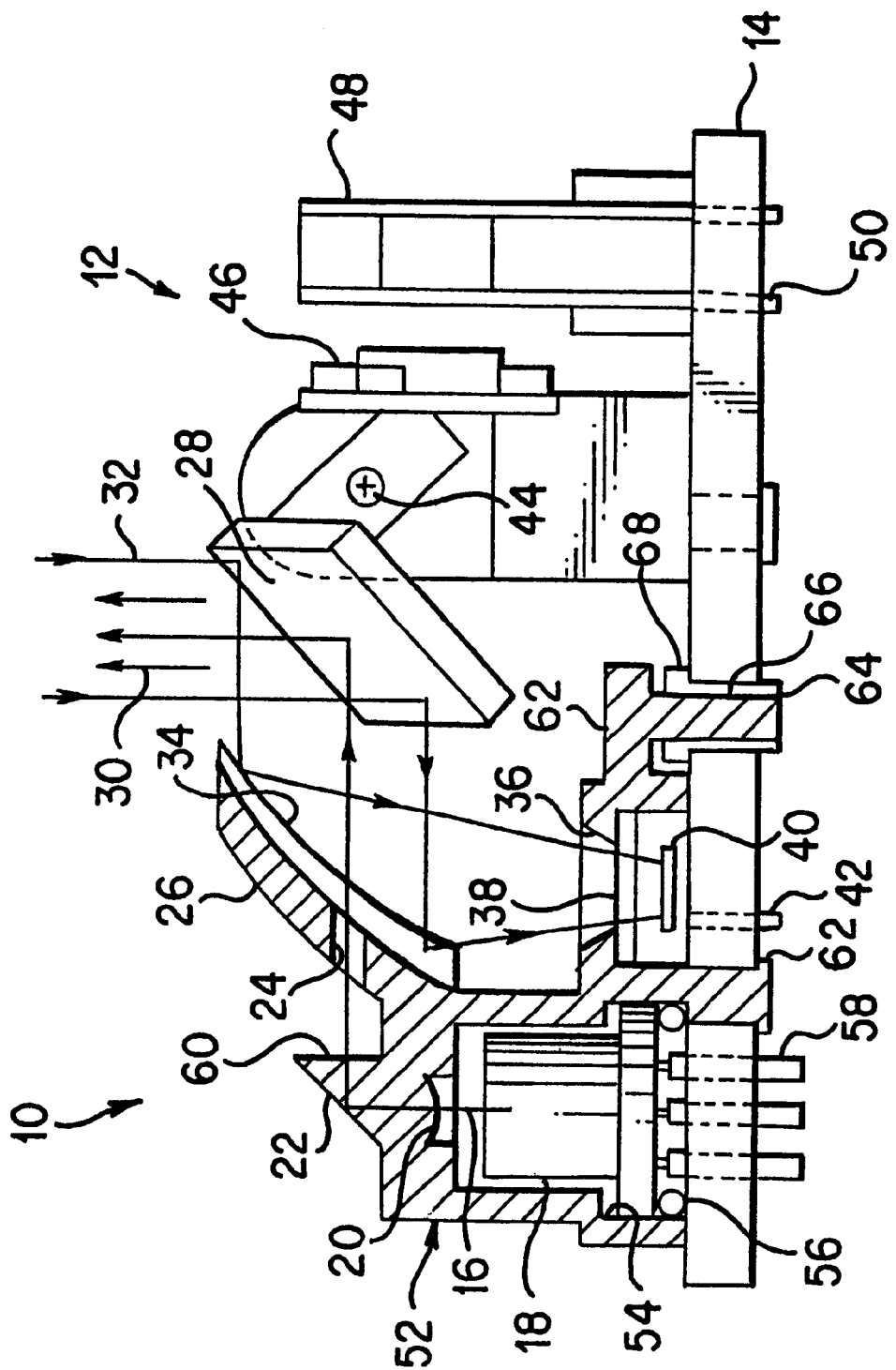
FIG. 1 is a partially sectioned view of an optical assembly according to the preferred embodiment of the invention.

FIG. 1 shows a low-cost optical assembly, according to the preferred embodiment, for creating a scanning laser beam for use in a bar code reader.

The optical assembly comprises two essentially separate portions, the "static optics" 10 and the scanner motor drive 12, both mounted to a common support or printed circuit board (PCB) 14. Before the structure of the assembly is described in detail, it may be helpful to provide a brief overview of the operation of the device. The light beam 16 from a semiconductor laser 18 passes through a molded plastics lens 20 and is turned through 90° by total internal reflection from a prism 22. After exiting the prism, the beam passes through an aperture 24 in a collector mirror 26, and impinges onto an oscillating scanning mirror 28. This produces a scanning of outgoing light beam 30, which is directed toward an indicia (not shown) to be read. Although the mirror 28 is shown as being angled, this is merely a drawing representation to render the shape and operation of the mirror clearer. The mirror sweeps a beam in the plane of the paper on which the drawing is presented, and orthogonal to the PCB 14.

Reflected light 32 from the indicia is first received by the scanning mirror 28, which directs it onto a concave surface 34 of the collector mirror 36. This focuses the light via an aperture 36 and a filter 38 onto a photodetector 40. The photodetector output signal is then passed on to suitable electronics within the PCB 14 by an electrical coupling 42.

The scanning mirror 28 is mounted at 44 for oscillation about an axis, this being achieved by virtue of the interaction between a permanent magnet 46 and a driven electromagnetic coil 48. A suitable driving signal is applied to the coil, via the PCB 14 and coil electrical contact 50.

The scanner motor drive 12 shown in FIG. 1 is exemplary, and may be replaced with any type of mechanism for effecting a scanning motion of the laser beam in one or two dimensions. For example, the scanner motor drive could comprise any of the configurations disclosed in U.S. Pat. Nos. 5,581,067 and 5,367,151, all of which are incorporated by reference. In this way, the static optics assembly 10 may be used as a component in a variety of scanner designs.

Although a light masking aperture 36 may be used in front of the photodetector 40, as shown in FIG. 1, for increasing the depth of focus of the photodetector, the same effect can be achieved without an aperture by appropriately specifying the area of the photodetector 40 itself.

Another key feature of the invention is that the aperture 24 is located in a position in the collector mirror 26 so that the beam path of the outgoing laser beam striking the mirror 28 is offset from the optical axis of the reflected light from the concave surface 34 of the collector mirror 26. In particular, in the preferred embodiment the aperture 24 is located below the optical axis of the collector mirror 26, as shown in FIG. 1 (and in the corresponding components in FIG. 11).

Figure 2C:
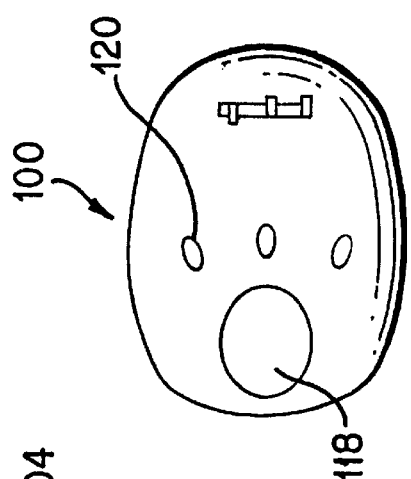
Figure 2B:
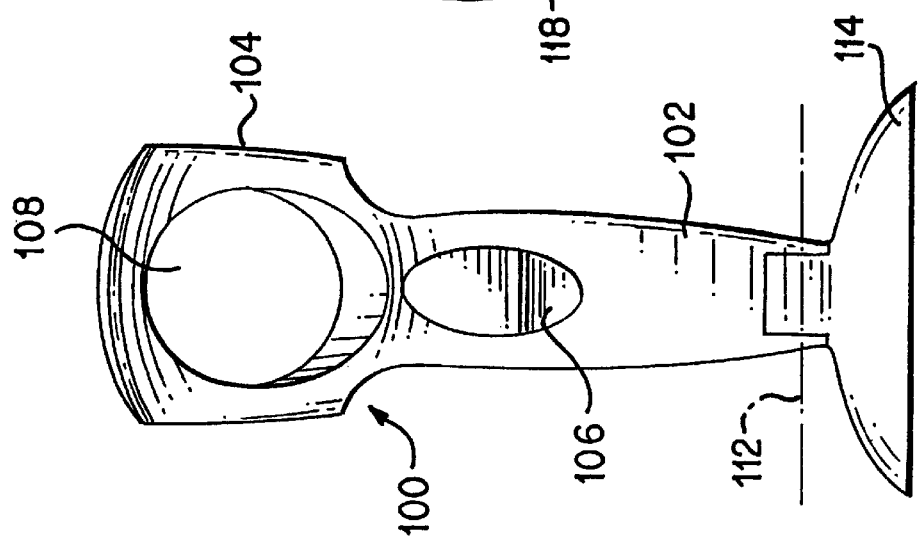
Figure 2A:
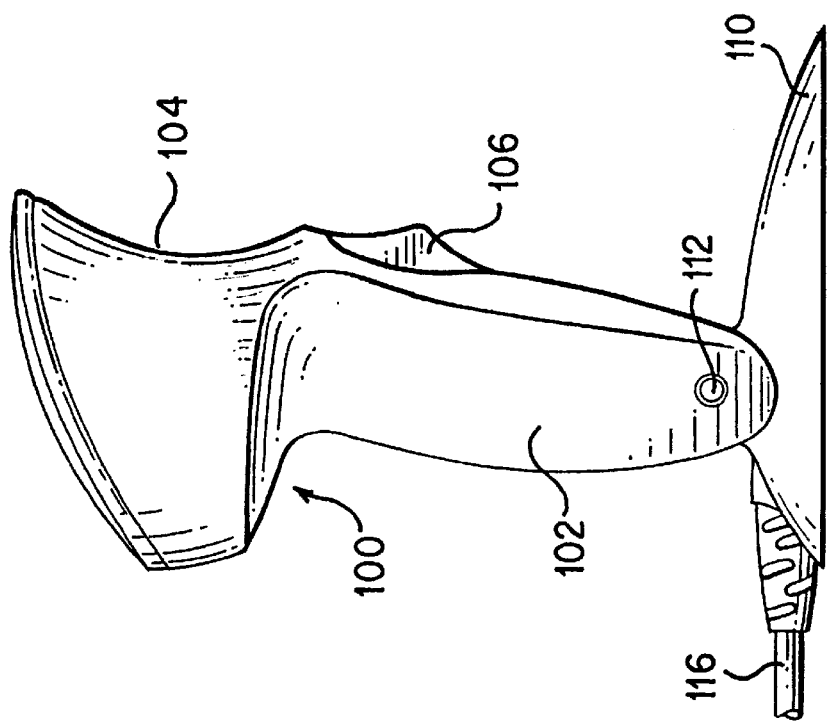
FIG. 2a shows a side view of a gun-type scanner suitable for use with the optical assembly of FIG. 1.
Figure 2D:
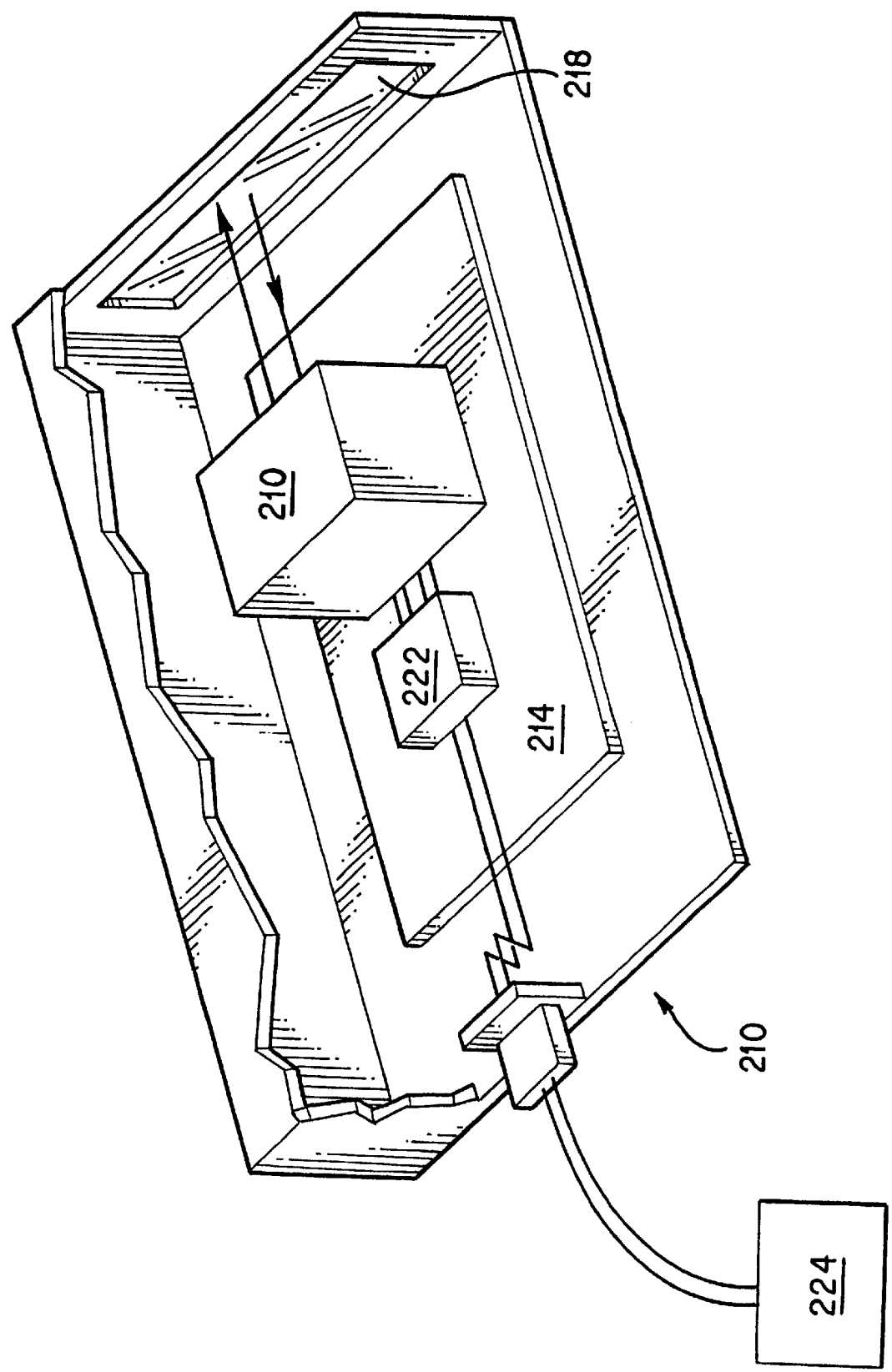
FIG. 2d is an exemplary hand-held optical scanner, suitable for use with the optical assembly of FIG. 1.

The important consequence of such design placement of the outgoing and return beam paths is that it permits an internal placement of the assembly in a compact housing configuration as that shown in FIG. 2d, in which the assembly of FIG. 1 is mounted on a printed circuit board (PCB) 214 with the outgoing beam parallel to the plane of the PCB. Note also that the assembly is situated in the housing so that the outgoing beam is substantially orthogonal to the surface of the window 218. The window 218 is depicted in the figure as being substantially perpendicular to the PCB 214 and flush with the outer surface of the housing 210. The same positioning of the window is illustrated in another configuration in the embodiment of FIG. 2e. Such mechanical designs are easy to manufacture, and enable a very compact reader to be designed.

Situating the window orthogonal to the outgoing laser beam, however, results in partial internal reflection of the outgoing light back in the same direction and therefore into the assembly. The possibility of using such a window and module configuration with the optical assemblies in the prior art would be counter to good design for optimum performance since in such configurations the reflected light from the window would be captured by the light collecting portion and directed to the photodetector, where it would be detected together with the returning reflected light from the bar code symbol, and create a very noisy signal. If the amount of reflection were substantial, the light could even flood the photodetector and overpower the signal of the returning reflected light from the bar code symbol. Bar code readers utilizing such modules or optical assemblies with prior art optical path designs would avoid such difficulties by typically utilizing a window that was mounted at an acute angle with respect to the outgoing laser beam (see, for example, the placement of the windows in the bar code readers depicted in U.S. Pat. Nos. 4,387,297; 4,409,470; 4,816,660; and 5,280,164). Any internal reflection from such tilted windows would be in a direction away from the optical assembly, thereby reducing the noise of the signal received by the photodetector. Such tilted window configurations require, however, more effort to implement mechanically, and increase the overall size of the housing.

The design of the optical path in the scan module according to the present invention permits the scan module to be mounted on a PCB, such as shown in FIG. 2d, so that the window can be placed flush with the surface of the housing and consequently orthogonal to the emitted laser beam. The scan module could also be mounted flush against the window for an even more compact arrangement. Although reflected light from the window is returned in the direction of the beam path of the outgoing laser beam, in the optical path design of the assembly of FIG. 1 the outgoing laser beam optical path is different from the optical axis of the reflected light from the light collecting portion. Thus, such internally reflected light would not be directed by the light collecting portion to the photodetector 40, and therefore would not effect the signal from the light reflected by the bar code symbol.

The implementation of the above-described offset outgoing and return light paths does not require the use of an apertured collector mirror 26. The laser light source and the photodetector must be positioned with respect to one another simply so that the emitted light beam partially reflected by the window and reflected by the light-collecting portion does not illuminate the photodetector, i.e. by having spaced-apart, or offset, optical axes.

Figure 3:
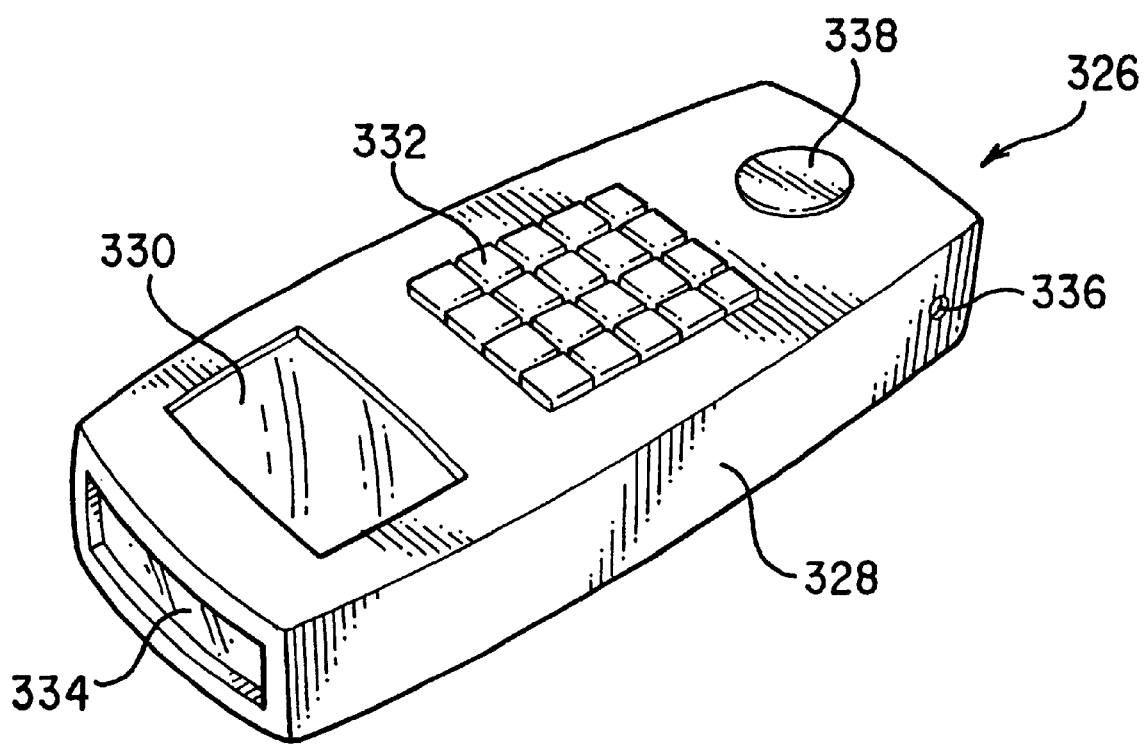
FIG. 3 is an exemplary hand-held combined computer terminal and optical scanner, again suitable for use with the optical assembly of FIG. 1.

The optical assembly shown in FIG. 1 may be incorporated within any type of fixed or portable optical scanner, for example the scan-type scanner of FIGS. 2a–2c the hand-held scanner shown in FIG. 2d or the hand-held computer terminal/scanner shown in FIG. 3.

Referring to FIGS. 2a to 2c a hand-held, gun-type scanner of ergonomic design is shown. The scanner includes a scanner body designated generated 100 including a handle portion 102 and a head portion 104. The handle portion 102 is configured to be held upright in the user's palm and has a forward portion including a trigger 106 positioned preferably to be operable by the user's forefinger. The head portion 104 is provided at the top of the handle portion 102 and includes a front face including a scanning window 108 and a bulbous rear portion extending rearwardly from the handle 102 to rest on or above the user's hand in use.

The scanner 100 is pivotably fixed to a base portion 110 about a pivot axis 112 provided at the lower end of the handle 102. The base includes a flat bottom face 114 and extends outwardly from the handle portion both forward and rear and to the sides such that the assembly as a whole can be placed freestanding stabily on a supporting surface. The scanner 100 is arranged to pivot on the base 110 in the forward/backward direction. The base 100 provides an interface between the scanner 100 and a host (not shown) by a cable 116. The cable 116 can simply carry power or can also include a data path either for control information to be passed to the scanner or for data read to be downloaded to the host from the scanner 100.

The base 110 includes on its underside 114 a pressure switch of any suitable known type (not shown) release of which indicates to a processor in the scanner that the scanner is being operated in hand-held mode. Accordingly the scanner switches to triggered mode indicating that reading will only take place when trigger 106 is activated.

Figure 4:
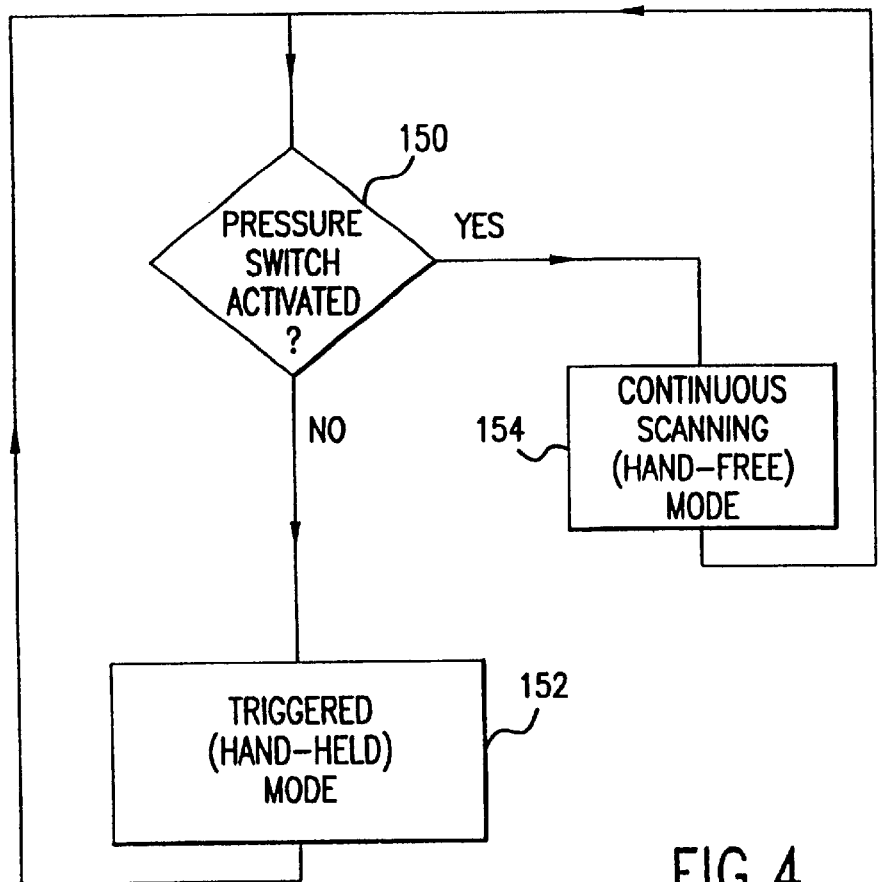
FIG. 4 is a flow chart showing operation of the scanner of FIGS. 2a–2c.

The control system is illustrated in more detail in the flow chart of FIG. 4. It will be seen that a continuous loop is maintained by a suitable controller establishing whether or not the pressure switch is activated (step 150). If the pressure switch is deactivated then triggered (hand-held) mode is entered (step 152); further discussion of relevant features may be found in U.S. Pat. No. 5,151,581, incorporated herein by reference.

In the alternative mode, where the pressure switch is activated, continuous scanning (hand free) mode 154 is entered. In this mode a presentation scan pattern is always activated allowing all items to pass in front of the scanner to be scanned. This can be used for example at a retail sales point such as a check-out stand. Accordingly the arrangement allows dual mode operation.

The scanner 100 shown in the figure is an omnidirectional scanner but the gun-type configuration provides the benefits of a conventional one-dimensional scanner. In addition the adjustable angle provided by the incorporation of a pivot axis 112 allows the scanner as a whole to be positioned at any desired pivot angle for ease of reading and also allows the base to be angled to a comfortable position when in hand-held mode.

The main body 100 and base 110 are preferably modular such that one or other components can be changed at minimum expense to arrive at, for example, a cordless embodiment. Optionally a mode button 118 is additionally provided on the upper face of the head 104 (see FIG. 2c) allowing the user to select a scanning pattern of any desired type for example based on the bar code symbols or other indicia to be read, or the scanning conditions. In addition indicator lights such as LEDs are provided at 120 which can indicate, for example, the mode of operation of the scanner, whether it is in hands-free or hand-held mode, and so forth.

Referring now to FIG. 2d, reference numeral 210 generally identifies a hand-held scanner in an alternative embodiment. The scanner may alternatively be gun-shaped, or any suitable configuration may be used. The scanner is manually-operable for example by a trigger (not shown). As known from the above-identified patents and applications incorporated by reference herein, a light source component, typically but not necessarily a laser, is mounted inside the scanner shown at block 210. The light source emits a light beam along a transmission path which extends outwardly through a window 218 that faces indicia, e.g., bar code symbols, to be read. Also mounted within the block 210 is a photodetector component, e.g., a photodiode, having a field of view, and operative for collecting reflected light returning through the window 214 along a path from the symbol.

The optical assembly of FIG. 1 is mounted within or as part of the block 210.

In whichever scanner type the arrangement is provided, operation is generally the same. The photodetector generates an electrical analog signal indicative of the variable intensity of the reflected light. This analog signal is converted into a digital signal by an analog-to-digital converter circuit. This digital signal is decoded by a decode module 222. The decode module 222 decodes the digital signal into data descriptive of the symbol. An external host device 224, usually a computer, serves mainly as a data storage in which the data generated by the decode module 222 is stored for subsequent processing.

The block 210 and decoder 222 are mounted on a PCB 214. In operation, each time a user wishes to have a symbol read, the user aims the scanner at the symbol and pulls the trigger or otherwise initiates reading of the symbol. The trigger is an electrical switch that actuates the drive means. The symbol is repetitively scanned a plurality of times per second, e.g., more than 100 times per second. As soon as the symbol has been successfully decoded and read, the scanning action is automatically terminated, thereby enabling the scanner to be directed to the next symbol to be read in its respective turn.

In addition, the head need not be a portable hand-held type as fixedly mounted heads are also contemplated in this invention. Furthermore, the heads may have manually operated triggers, or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Turning now to FIG. 3, there is shown an alternative hand-held optical scanner including additional features, this time taking the form of a scanning terminal 326. The terminal comprises a hand-held case 328 having a data display screen 330 and a data input keypad 332. The optical assembly of FIG. 1, within the case 328, produces a scanning light beam which extends outwardly through a window 334 which faces the indicia to be read. Light reflected from the indicia passes back through the window 334 and impinges on the photodetector component, for example a photodiode, which creates a returning light output signal. The information content within that signal may be stored in an on-board memory (not shown) or may be downloaded to a remote computer via a data port 336. Alternatively, the information may be transmitted via a radio frequency signal produced by an on-board radio transmitter/receiver 338.

In one embodiment the motor drive used to obtain scanning action is preferably a "taut band element" drive. This type of drive is fully described in, inter alia, U.S. Pat. Nos. 5,614,706 and 5,665,954 which are commonly assigned herewith and incorporated herein by reference. In essence, the arrangement includes an optical element such as a lightweight mirror mounted on a thin flexible strip (the "taut band") mounted across an electromagnetic coil. A permanent magnet is attached to the optical element which interacts with a varying magnetic field created when an AC signal is applied to the coil to cause repetitive torsional motion in the flexible strip. As a result the optical element oscillates providing scanning motion.

Figure 5A:
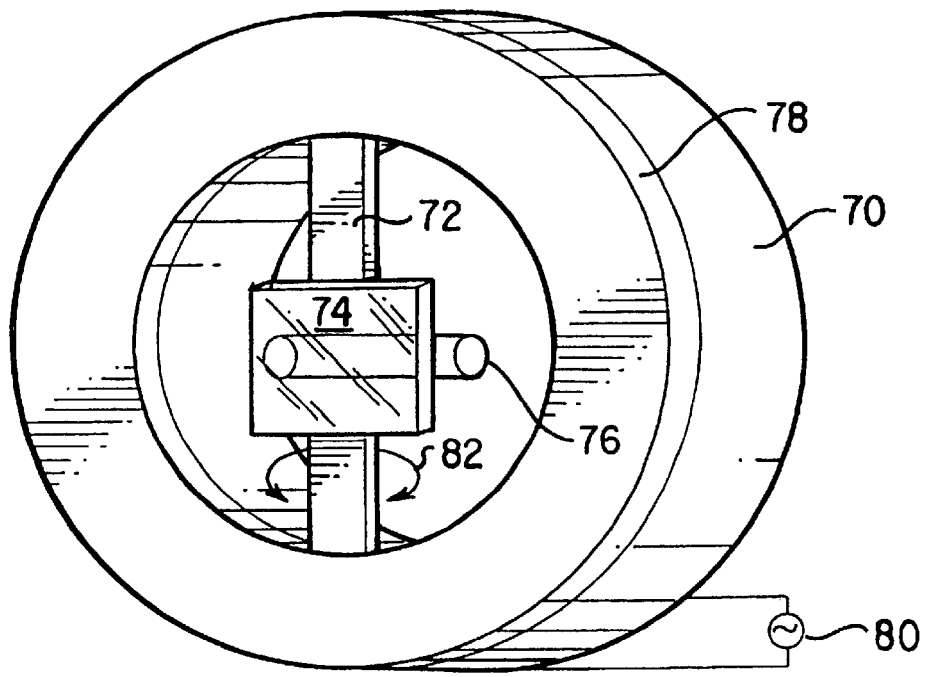
FIG. 5a shows a thin flexible band drive of known type.

FIG. 5a shows a taut band element drive of known type in more detail. In particular coil 70, flexible strip 72, mirror 74 and permanent magnet 76 can be seen. The flexible strip 72 can be held against the coil 70 for example by a holding annulus 78. An AC voltage applied to the coil is represented schematically at 80 and causes torsional oscillation represented schematically by arrow 82. It will be apparent that this arrangement can replace the arrangement shown generally in FIG. 1 as mirror 28 and drive arrangement 44,46,48 in a manner apparent to the skilled reader.

Figure 5B:
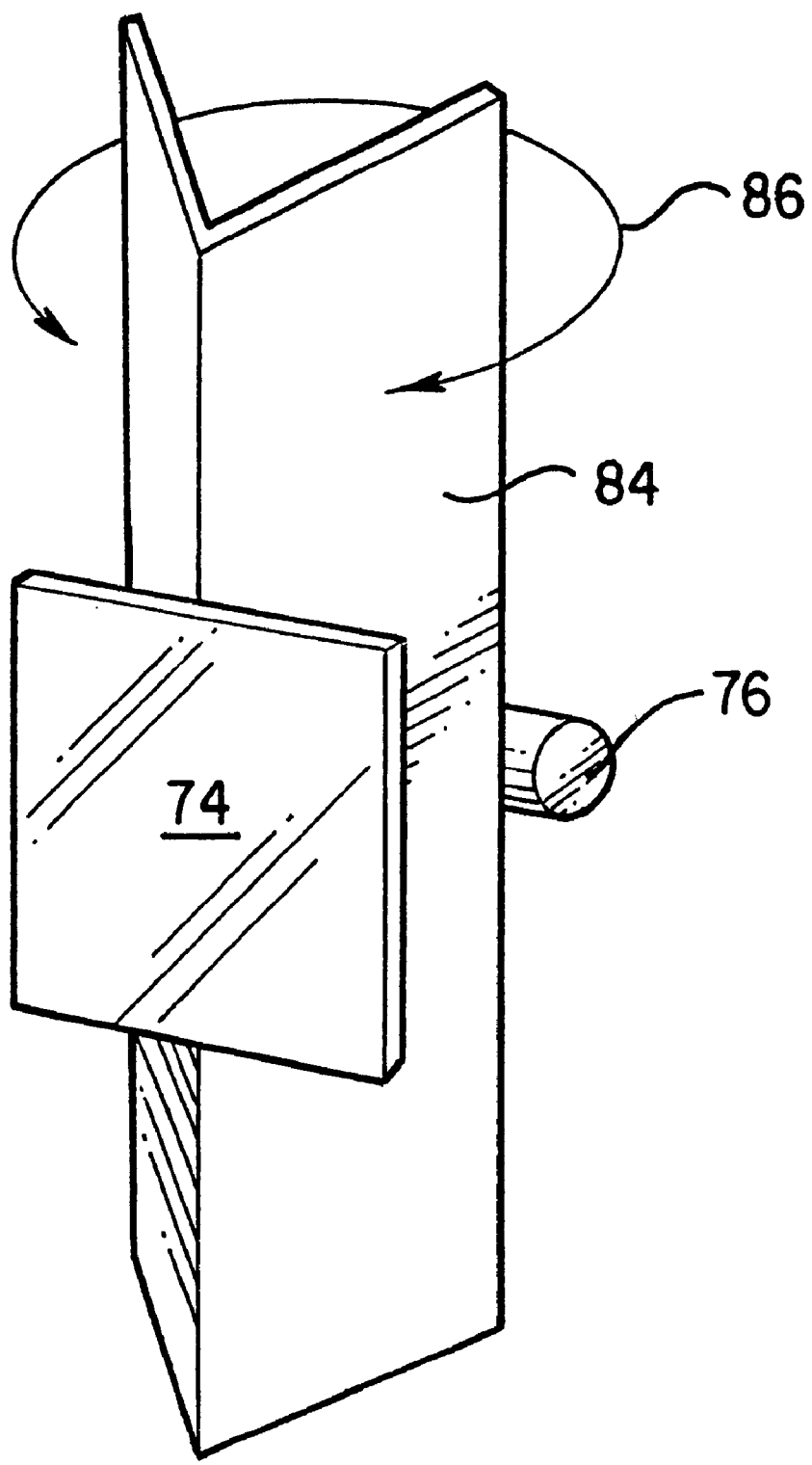
FIG. 5b shows an improved thin flexible band.

In a further embodiment shown in FIG. 5b the flexible strip 72 is replaced by an elongate element 84 which is V-shaped in cross-section perpendicular to its elongate axis on which is mounted the mirror 74 and permanent magnet element 76. The V-shaped element 84 extends across a coil or is otherwise appropriately mounted in the same manner as previous thin flexible element 72 and the permanent magnet 76 interacts with the AC magnetic field resulting in torsional deflection represented by arrow 86. The V-shaped cross section of the band increases its stiffness and in particular ensures that the torsional deflection is uniform or substantially uniform over the length of the band, the mirror 74 being mounted on the apex of the "V". It will be appreciated that alternative configurations for the band cross section can be contemplated such as X shaped, I or H shaped, W shaped as long as the requirements of torsional deflection and uniformity of that torsional deflection along the length of the band are maintained.

Figure 6:
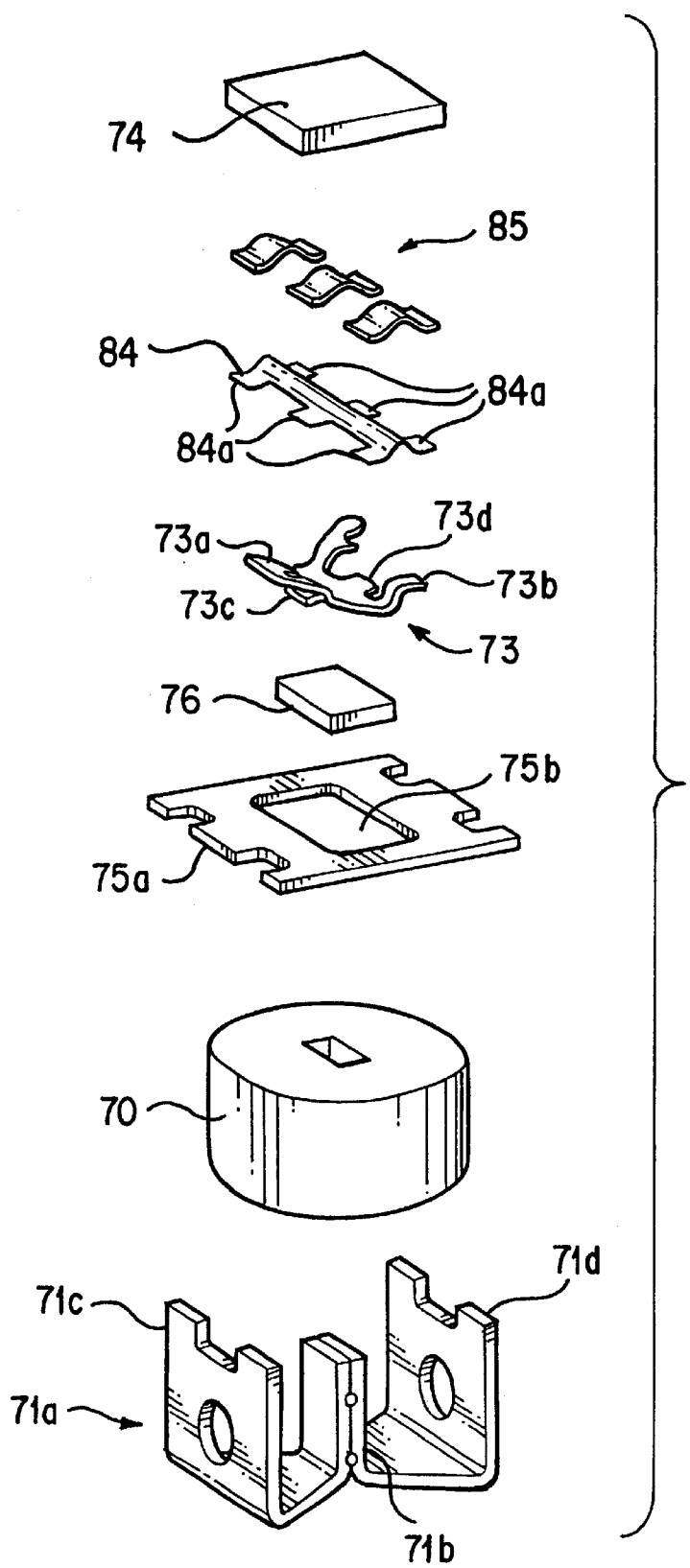
FIG. 6 is an exploded view showing mounting of the thin flexible band of FIG. 5b.

FIG. 6 shows in exploded form a practical mode of mounting the V shaped element 84 of FIG. 5b. Coil 70 is mounted on an E-configuration core 71a including a central arm 71b which is received in the central recess of the coil 70 and outer arms 71c and 71d which extend either side of the coil and above it. A mounting plate 75a is received on the outer arm 71c, 71d of the Ecore and extends above and across the coil 70. The mounting plate 75a includes a central aperture 75b defining the space across which the V-shaped element 84 extends. The V-shaped element 84 includes limbs 84a extending either side of its longitudinal axis symmetrically at either end and the centre and is mounted on the mounting plate 75a across the aperture 75b in any suitable manner, for example by securing the end limbs 84a to the upper face of the mounting place 75a. Cooperatingly configured V-shaped connecting elements 85 are secured to the V-shaped element 84 and generally aligned with the limbs 84a and the mirror 74 is mounted on the connecting elements 85 at the apex of the V-shaped element. Depending from the mirror 74 is a yoke 73 also substantially of V shaped but straddling the V-shaped element 84, having its outer ends 73a,73b attached to the rear of the mirror 74. The yoke 73 has a central portion which extends away from the mirror 74 and has lateral tabs 73c,73d. The lateral tabs 73c and 73d are in register with the central limbs 84a,84b of the V-shaped element and are attached thereto. The permanent magnet 76 is attached to the underside of the central portion of the yoke 73 for example to the underside of the tabs 73c and 73d. Accordingly the yoke 73 straddles the V-shaped element 84 such that the permanent magnet projects over or through the aperture 75b in the mounting plate 75a allowing optimum magnetic coupling with the coil 70. When an AC current is applied to the coil 70 the permanent magnet 76 oscillates which in turn gives rise to torsional flexing of the V-shaped element 84 and oscillation of the mirror 74. The assembled arrangement is shown in FIG. 7.

Figure 8:
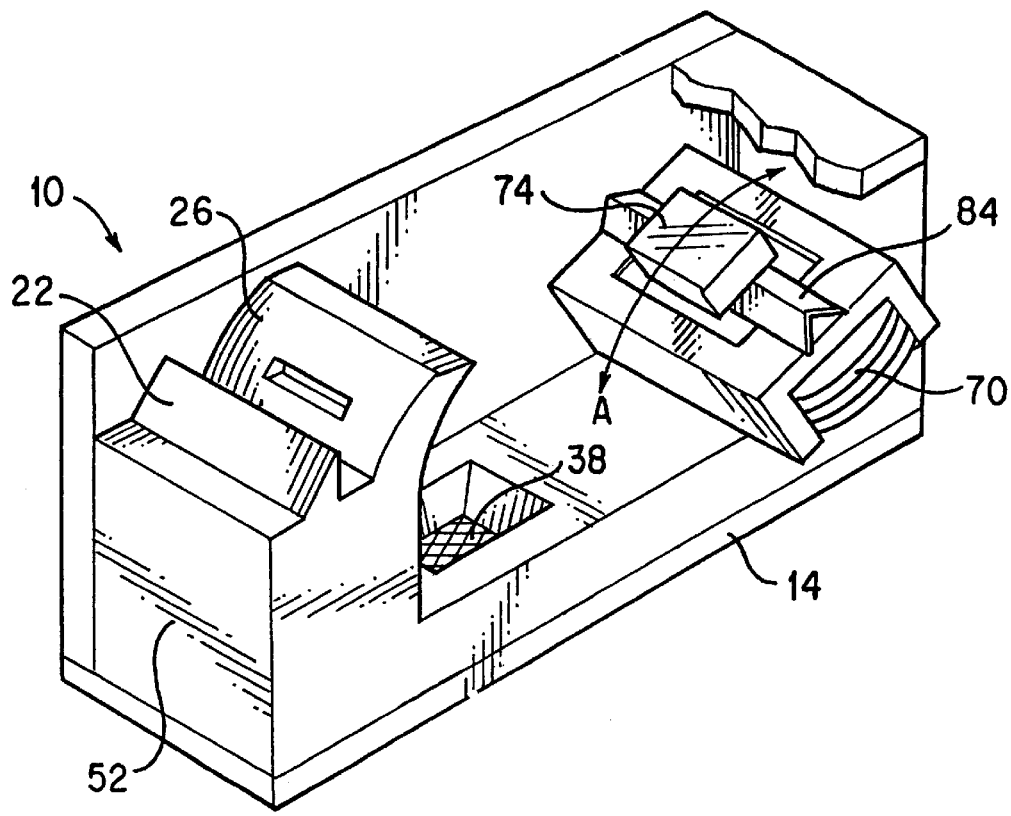
FIG. 8 shows an optical assembly in a housing in cut-away form.
Figure 7:
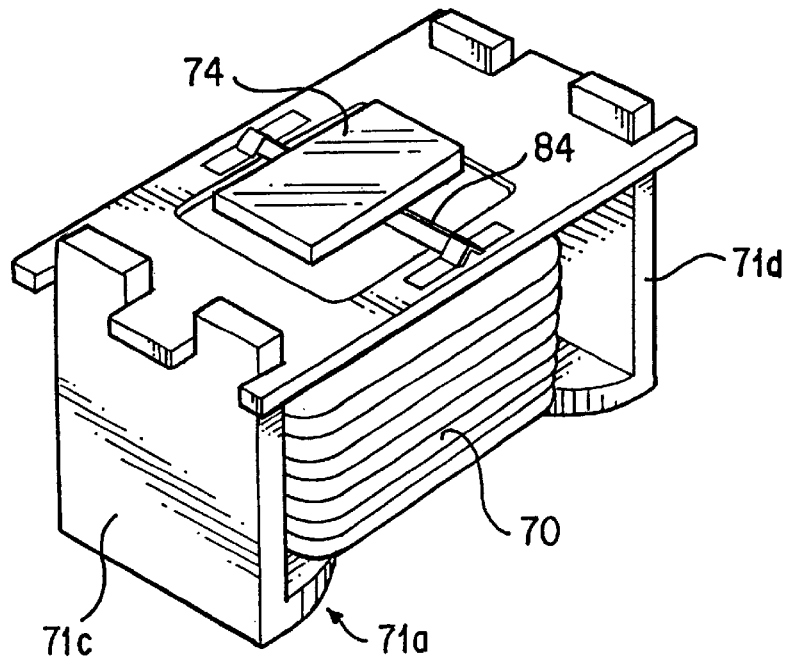
FIG. 7 shows the components set out in FIG. 6 in assembled form.

An assembled module incorporating the arrangement of FIG. 7 is shown in FIG. 8 in which it will be seen that a substantially cuboidal housing is incorporated. The direction of angular motion of the mirror is depicted by arrow A.

Figure 11:
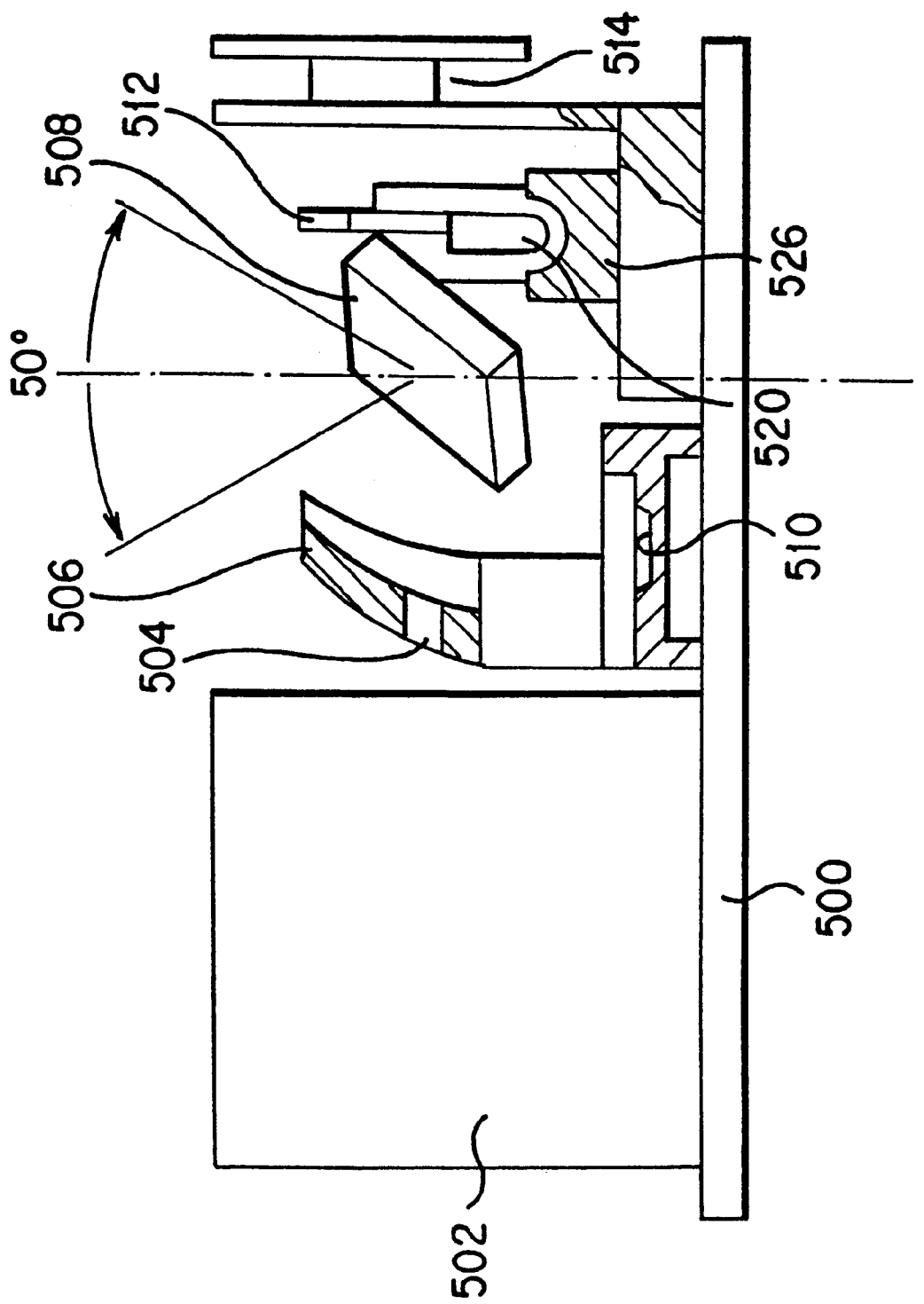
FIG. 11 shows an alternative scan assembly configuration.
Figure 12:
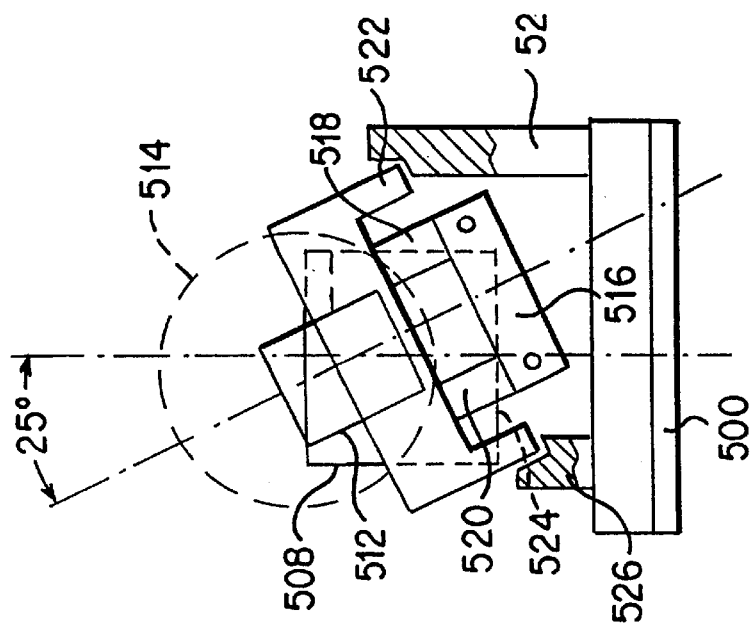
FIG. 12 is an end view corresponding to FIG. 11.

In another preferred embodiment, the type of motor drive used to oscillate the scan mirror can be a Mylar leaf spring supporting an unbalanced mirror assembly. In FIGS. 11–12 the mirror assembly is mounted to a Mylar leaf spring which flexes as the permanent magnet is driven by the AC coil imparting an oscillating force.

Yet a further alternative is a "micro machined" mirror assembly as discussed in U.S. patent application Ser. Nos. 08/506,574 and 08/631,364 according to which the mirror is driven back and forth directly by a suitable drive motor, preferably of very small dimension. Yet a further alternative is to use a mirror of known rotating polygon type as discussed in the introduction in relation to U.S. Pat. No. 4,251,798 according to which the mirror comprises a solid body having a plurality of face angled to one another. As the body rotates the beam is scanned by successive rotating faces of the polygon body. In one embodiment the Mylar motor can be used in an arrangement for one dimensional scanning while a V-shaped taut band element (described above) can be used for two dimensional scanning also as discussed in more detail below.

Turning now to the static optics assembly 10 shown in FIG. 1, it will be noted that the laser focusing lens 20, the laser aperture 24 and the collection mirror 26 are all defined by a single molded plastics material member, shown in cross-hatching and indicated generally by the reference numeral 52. The molded member 52 further acts to house and to locate the laser 18, the filter 38 and the photodetector 40.

The preferred laser 18 is a semiconductor laser is mounted by conventional through-hole techniques on the PCB. The photodiode is preferably an SMD ("surface mounted device") device as is the AC coil for the Mylar leaf spring motor. This eliminates the need for standoffs and hand-soldering or sockets, as are used on prior art scanners. Typically, the laser will be a standard packaged edge-emitting laser. For minimum cost, the laser focusing is not adjustable, and the laser is simply installed with its mounting flange in contact with a shoulder molded as part of the molded member. This will position the laser accurately enough with respect to the molded focusing lens 20 to provide adequate performance within an inexpensive scanner. The fact that the focusing lens is molded as part of the same component as the shoulder 54 minimizes tolerance build-ups that could otherwise cause improper focusing.

The laser is held in place within the molded member 52 by means of W-curing 10 cement. Since the plastics material of the molded member is transparent to W light, the cement may be cured by shining UV light through the member into the cavity within which the laser is positioned. Cement may be applied to the laser 18, or to the molded member 52, with the laser then being pushed into the cavity until it abuts the positioning shoulder 54. The assembly may then be exposed to ultraviolet light for a few seconds, so curing the cement. If desired for higher performance, this method of retaining the laser also allows for a focusing adjustment to be made. In this case, the laser is gradually slid into the cavity while the output beam is being monitored. When correct focus is achieved, the assembly is exposed to W light, thus curing the cement and locking the assembly into place.

In the unadjusted assembly, it may be possible to eliminate the cement by spring-loading the laser up against the positioning shoulder 54, for example by means of a rubber or foam washer 56 between the PCB 14 and the bottom of the laser 18.

As shown in the drawing, the laser 18 has downwardly-extending electrical leads 58 which are simply installed directly into the PCB 14. This eliminates hand-soldering, but soldering could be used if desired.

The fact that the leads extend downwardly into the circuit board means that in a conventional laser, the beam will be directly upwardly perpendicular to the board. The prism 22, previously described, is molded into the top of the molded member 52 to direct the vertical laser beam through the aperture 24 in the collector mirror 26 towards the scanning mirror 28. The prism 22 uses total internal reflection to reflect the laser beam, so it is not necessary to coat the upper surface with a reflective coating.

To provide for further focusing of the laser beam, should it be desired, it would also be possible to shape the exit surface 60 of the prism.

It is desirable that, somewhere along its path, the laser beam should pass through beam stop. The aperture 24 in the collector mirror 26 may serve this purpose. Alternatively, the lens 20 or the reflecting or exit surface of the prism 22 could provide the beam stop.

In fact it is preferred to keep the aperture 24 as small as possible which improves the collection capability of the collector mirror 26. For example the aperture 24 may be in the region of 0.5 mm in diameter. This provides an additional advantage as the resulting diffraction pattern gives rise to a light distribution following a Bessel function which is particularly well adapted for scanning indicia.

The molded member 52 needs to be secured to the circuit board 14, and to that end snaps 62, 64 are provided. These automatically latch onto the circuit board when the component is installed. Alternatively, posts on the lower side of the molded member may protrude through the board to be heat-staked onto the bottom of the board. Ultrasonic staking could also be used.

The collector mirror 26 is coated with a reflective coating so that light impinging upon it will be reflected downwardly toward the photodetector 40. This coating may also cover that part 62 of the molded member that serves as a housing for the photodiode. This will render the optics assembly opaque in that area to prevent any light from reaching the photodiode except via the aperture 36 and the filter 38.

This reflective coating may also serve another function. Typically, the coating will be a thin film of metal such as gold, aluminum or chrome. These films are electrically conductive. A Accordingly, the film also acts as an electromagnetic interference shield for the photodiode 40. The use of a surface coating to protect the photodiode enables the usual EMI shield to be dispensed with, thereby eliminating both the cost of a separate shield and the labor to have it installed within the assembly.

The coating is electrically grounded by extending a projection 66 of the molded member into a small socket 68 in the PCB. Alternatively, the projection 66 could be press-fitted into a plated through-hole in the board.

The housing portion 62 of the molded member 52 not only acts to hold the optical filter 38 in place on top of the photodiode 40, but also entirely surrounds the photodiode, thereby preventing stray light from reaching it. The aperture 36 in the housing may be small to limit the f field of view of the detector, maximizing ambient light immunity. The aperture needs to be accurately located with respect to the collector mirror 26, to allow the use of a minimum-sized field of view. Accurate relative positions of the aperture and the collector mirror are easily achieved since they are molded as a single part.

In certain circumstances it is desired to provide an arrangement in which the beam 30 leaves the optical assembly at an angle other than 90° to the vertical (relative to the PCB 14). For example there may be instances in which the mounting requirements mean that the PCB 14 is mounted at a non-orthogonal position. In previous arrangements it has been necessary to overcome this problem by introducing additional spacers when mounting the PCB 14 such that the beam 30 leaves at the desired angle. This problem is solved by adjusting the angle by which the beam exits the optical assembly to compensate for the mounting angle and remove the need to mount the PCB including a spacer. This is achieved by altering the angle of the scanning mirror assembly 28, which is of particular benefit as no adjustment of the laser mounting would be required. It will be appreciated that the remaining optics may also require adjustment to further compensate which adjustments can be easily achieved by the person skilled in the art.

The angle involved is dependent on the particular consumer requirements but may be in the region of 45–90° to the PC board, more preferably in the range of 60–70° and most preferably 65° to the PCB.

FIGS. 11 and 12 show an alternative optical assembly and motor drive embodiment to FIG. 3 according to an embodiment of the invention. Although illustrating two-dimensional scanning, the arrangement of components may also be configured for one-dimensional scanning alone. The arrangement is mounted on a single base board 500 and includes a laser assembly 502 of suitable type for example of the type discussed above. In this embodiment, the laser assembly 502 may be mounted on the chassis including peripheral side 550, which also acts as a heat sink for the laser. A beam from the laser assembly 502 is not folded, but directly passes through an aperture 504 in a collector mirror 506 and is reflected by a scanning mirror 508. The returning beam is retroreflected onto the collector mirror 506 and directed to a detector of suitable known type 510.

Turning now to the drive assembly for the scanning mirror 508 in more detail, the mirror is mounted in conjunction with a permanent magnet 512 which interacts with a magnetic field provided by an AC current driven coil 514 to oscillate the mirror. The mirror is mounted relative to the base 500 via an attachment element 501 which is connected to the mirror by two Mylar springs 518,520. Although the mirror is mounted parallel to the base the attachment element 516 is mounted at 25° to the horizontal base and the Mylar springs which extend perpendicular to the attachment strip 516 are hence at 25° to the vertical. Accordingly a scanning plane is defined at 25° to the vertical as discussed in more detail below. It will be appreciated, of course, that any appropriate angle can be selected. The scan angle is then defined by the amplitude of motion of the mirror and is preferably selected to be 50°. The mirror assembly is of the unbalanced type, that is, no counterweights are provided against the mirror mass as considered relative to the point of support.

The use of an unbalanced mirror, i.e., one in which no counterweights are provided in the mirror assembly, is particularly suitable in implementation in which the mirror is driven at a speed of greater than 100 scans per second. With an unbalanced mirror, since the attachment points of the mirror to the flexible springs is not the center of mass of the mirror assembly, while the mirror is at rest, gravity will exert a relatively greater force on the side of the mirror assembly having the greater mass, causing the mirror to "droop" on its heavier side and pull on the flexible springs. Of course, the effect of such force depends on the orientation of the scanner with respect to the force vector of gravity. The same "drooping" effect is present when the mirror is scanning at relatively low speeds, so in such applications the use of a balanced mirror would be preferred. A balanced mirror, however, requires additional mass be added to the mirror, or mirror assembly, which is a drawback in terms of operating design weight and consequentially the power requirements.

In the embodiment of high speed operation (i.e. at more than 100 scans per second), the material composition, size, shape and thickness of the spring may be appropriately selected to achieve the desired resonant frequency. For example, for operation at approximately 200 scans/second, the selection of a Mylar spring with a thickness of 4 mil is appropriate. For operation at 400 scans/second, a stainless steel spring with a thickness of about 3 mil is preferred.

It will be seen that the mirror 508 is angled relative to the vertical to direct the scanning beam out of the upper face of the assembly. As with FIG. 1, although the mirror 508 is represented in FIG. 11 as being also angled out of a plane orthogonal with a plane of the paper, this is merely a drawing representation to render the figure clearer. It will be seen that the attachment element 516 includes limbs 522 and 524 extending either side of the Mylar springs 518,520. These limbs are positioned within shaped recesses in side blocks 526,528 allowing a certain amount of clearance for the limbs which provides adequate space for the desired scanning angle to be achieved while providing stops to limit the amount of oscillation of the mirror should a shock be imparted to the unit, for example by dropping it.

Figure 13B:
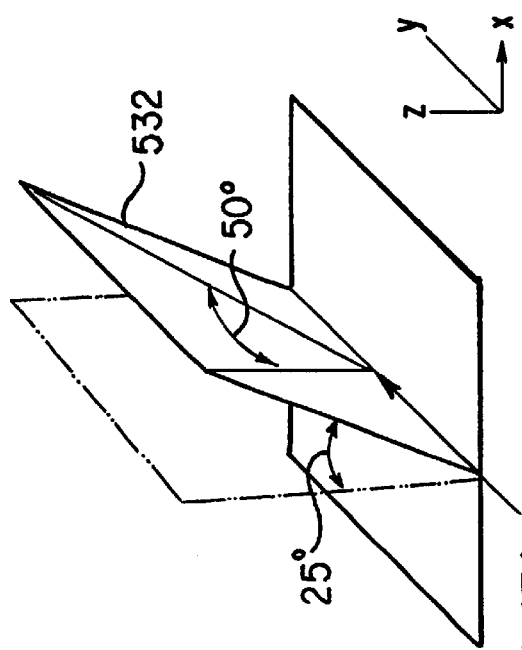
FIG. 13b illustrates the scanning plane in an assembly of the type shown in FIG. 11.
Figure 13A:
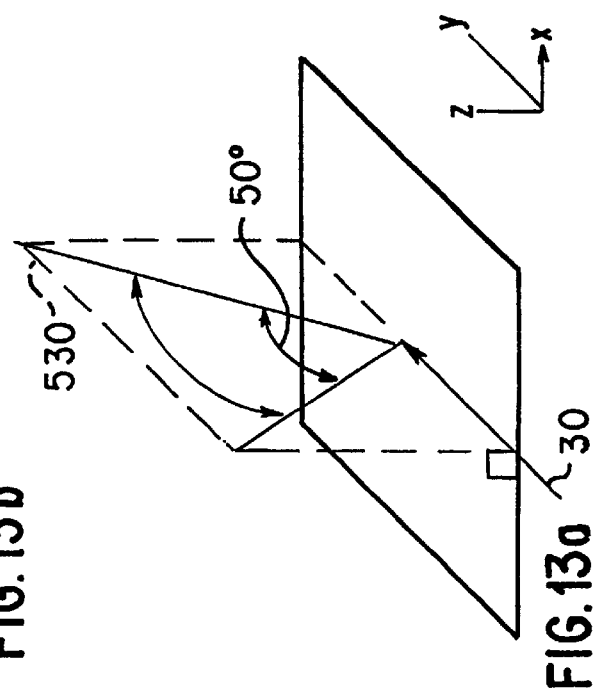
FIG. 13a illustrates the scanning plane in a conventional assembly.

Accordingly a beam emitted by the laser assembly 502 incident on the mirror 508 is swept through an angle of 50° by the scanning mirror, however the plane of sweep of the beam (the scan plane) is not at 90° to the base 500 but is at an angle constrained by the direction in which the magnet is driven to oscillate i.e., the axis of flexing of the Mylar springs. This can be best be understood with reference to FIGS. 13a and 13b. In FIG. 13a the laser beam 30 enters in the Y direction. The mirror and drive assembly are not shown but in FIG. 13a the normal mirror configuration is assumed that is the mirror is angled at 45° to the X Z plane and is mounted to oscillate about the X direction. As a result a scan plane 530 is established in the Y Z plane. However in FIG. 13b the mirror and mirror drive are mounted as discussed in relation to FIGS. 11 and 12. It will be seen, therefore, that the scan line is obtained in a plane 532 at 25° to the Y Z plane. Again, any desired scan plane angle or scanning angle can be selected.

Accordingly a non-90° output angle of the beam is achieved in a different manner.

Figure 9:
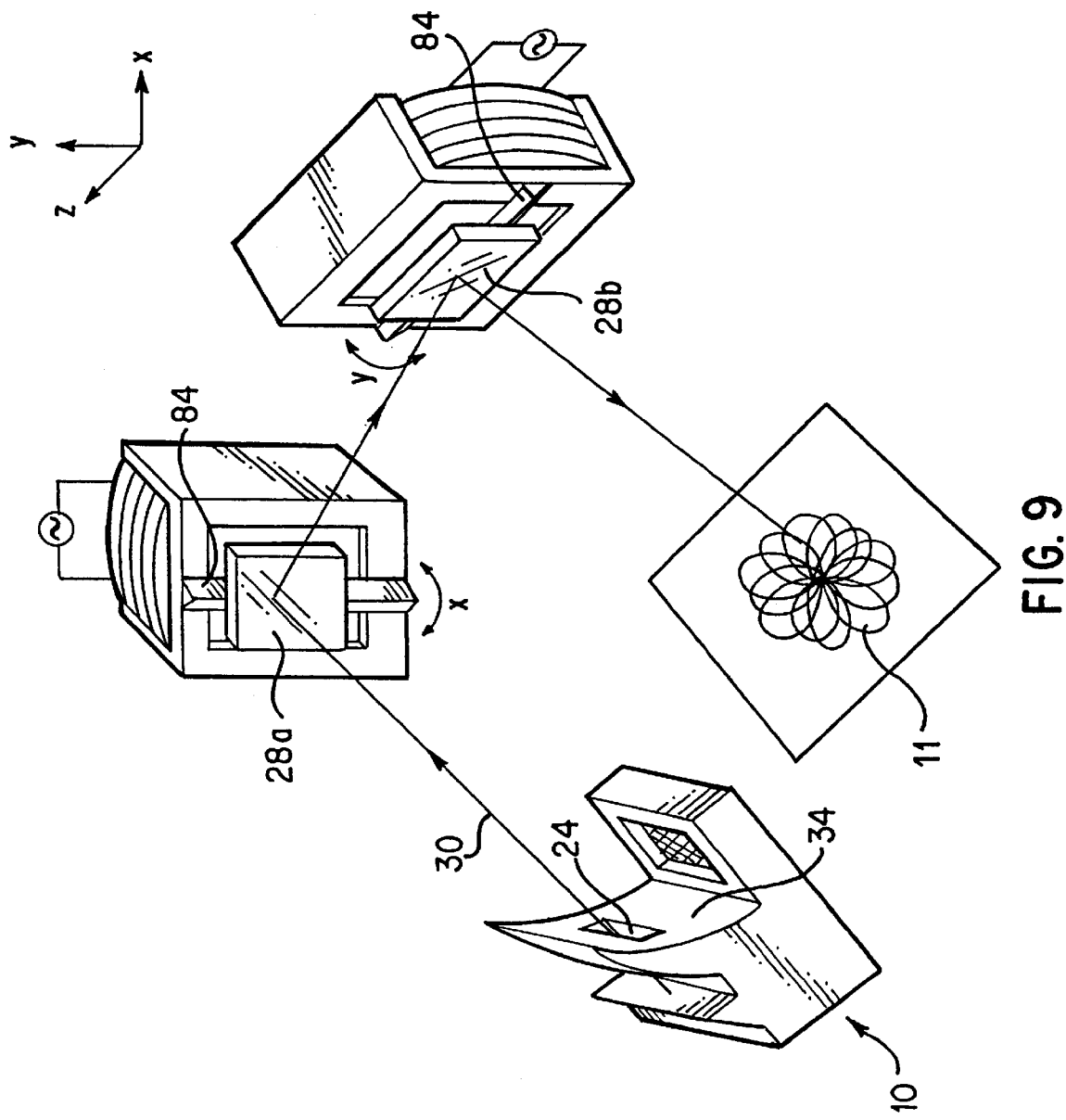
FIG. 9 shows a 2D scan motion scanner assembly.
Figure 10:
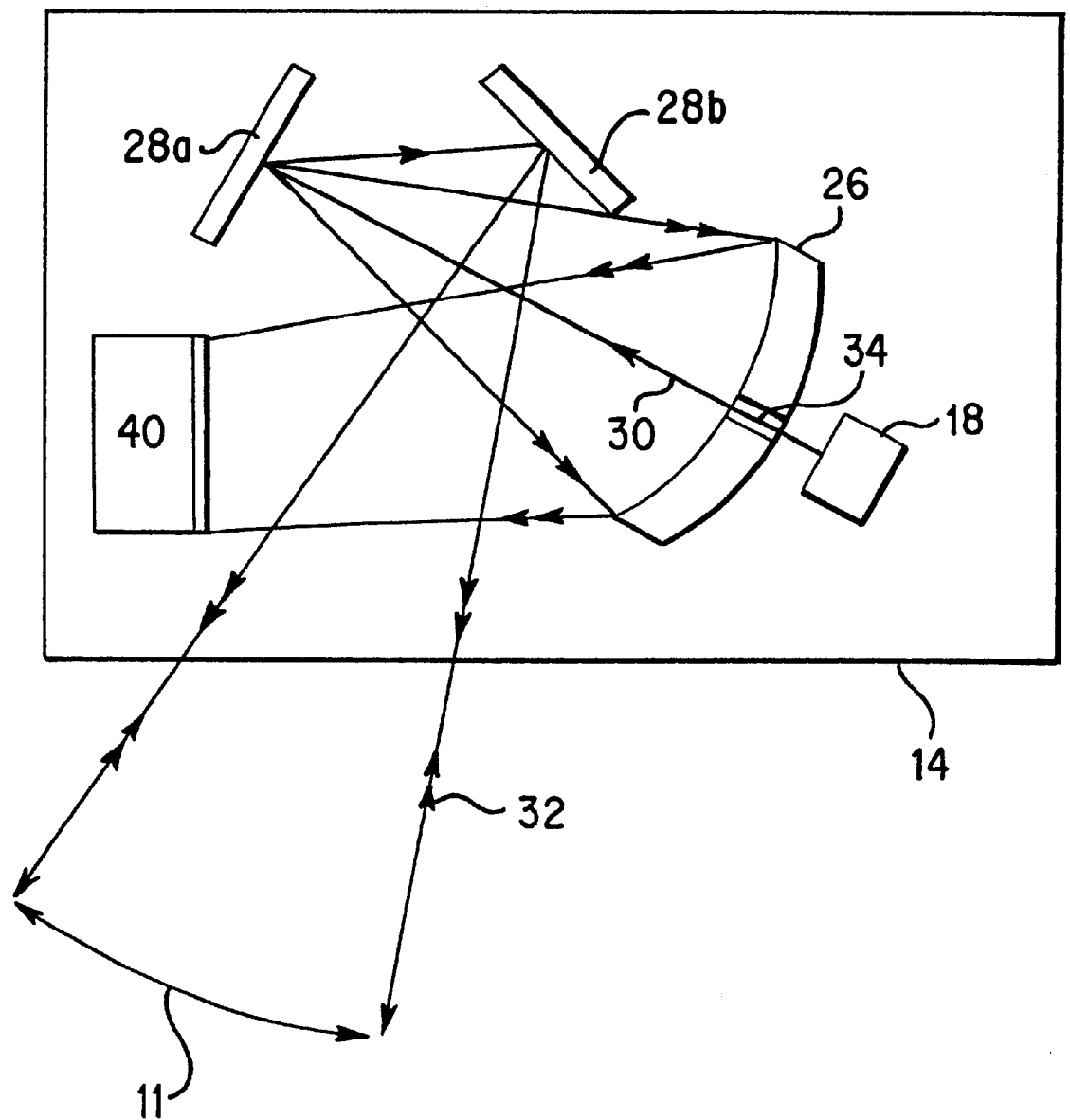
FIG. 10 is a schematic plan view corresponding to FIG. 9.

FIG. 9 shows a second preferred embodiment in which two-dimensional scanning motion is achieved by using two mirrors each oscillating in an orthogonal claim. Multi-pattern scanners can be achieved by using two reflector X-Y motion as described in U.S. Pat. Nos. 5,581,070, 5,637,856 and 5,614,706 all of which are incorporated herein by reference. Preferably the two reflectors are driven by a thin flexible element-type drive of the type shown in FIG. 5a or FIG. 7. In particular the optical module 10 emits a beam 30 through aperture 24 in collector 34 which is oscillated in a first direction for example the X direction by a first oscillating mirror 28a mounted on a first V-shaped element 84 and is then oscillated in a second direction for example the Y direction by a second mirror 28b mounted on a V-shaped band 84. As a result any desired scanning pattern can be achieved at the target as represented schematically by pattern 11. All of the elements are preferably provided in a single module as can be seen from the base lay out depicted in FIG. 10. In particular laser 18 emits an outgoing beam 30 through an aperture 34 in collector mirror 26. The beam is oscillated in the X direction by mirror 28a and in the Y direction by mirror 28b giving rise to a scanning pattern shown schematically at 11. The returning beam 32 returns along the reflection path and is directed onto the detector 40 by the collector mirror 26. It will of course be appreciated that the arrangement is preferably used in conjunction with the optical assembly shown in FIG. 1 and the exact positioning and orientation of the parts will be apparent to the skilled reader.

Figure 14:
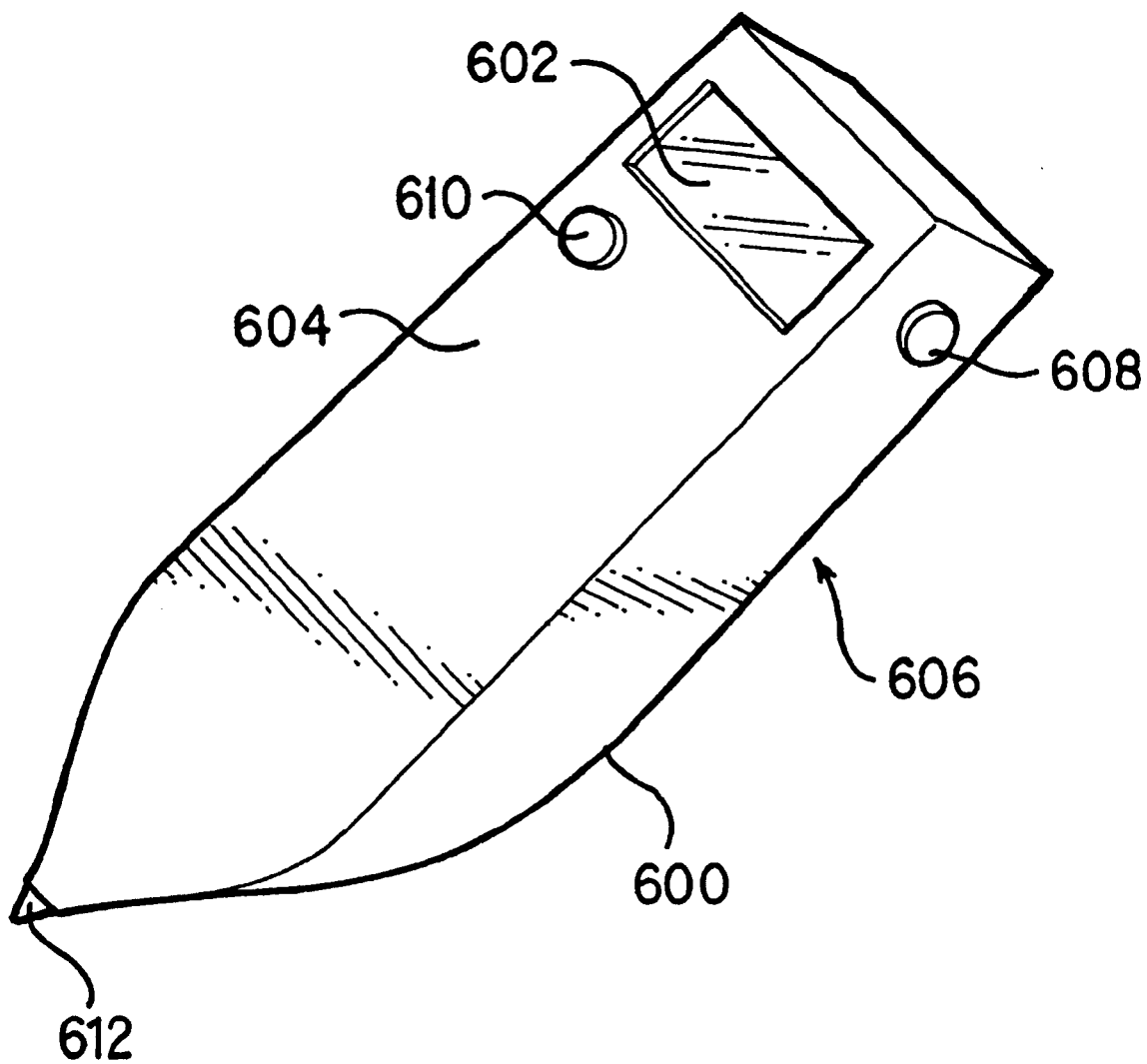
FIG. 14 shows an alternative bar code reader housing.

FIG. 14 shows an alternative scan engine form-factor and ergonomic housing variation for incorporation of the scanner described herein or any other suitably dimensioned scanner. In particular the scanner is incorporated into a pen-type housing 600 having a scanning window 602. The pen-type housing 600 is preferably elongate having broad front and rear faces 604,606 and narrow side faces. The scanning window is preferably provided at the upper end of broad face 604, at the opposite end to the pen "nib" 612. Scanning can be triggered by one or more triggers 608,610 provided for example on the side or front face of the pen housing 600. The pen nib 612 can either be a conventional pen or an electronic pen. Because of the broad faces the arrangement easily houses a scanner module of the type described herein. In addition the positioning of the window 602 allows ergonomic scanning and the positioning of a plurality of triggers allows left or right handed users to use the scanner with ease. It will be seen that the broad rear face 606 of the housing 600 contacts the user's palm in reading mode for comfort and ease of use while in the writing mode the narrow side face contacts the user's palm, so that the arrangement can be used normally as a pen.

We claim:

1. In a system for electro-optically reading bar code symbols by directing a light beam along a first outgoing path through a window toward and across a symbol for reflection therefrom, and by detecting light reflected from the symbol and passing through the window along a second return path, a retro-reflective scan module, comprising:

a) a support component constituted of a material transmissive to the light beam and having interior compartments;

b) a planar board lying in a plane and supported by the support component;

c) a light source and a light sensor respectively situated within the compartments in a side-by-side relationship, the light source being operative for emitting the light beam in a first direction perpendicularly to the plane through the transmissive material of the support component away from the board, and the light sensor being operative for detecting the reflected light in an opposite direction, which is countercurrent and parallel to the first direction, toward the board and for generating an electrical signal corresponding to the detected light and indicative of the symbol;

d) a single, generally planar scan mirror mounted for reciprocal oscillating movement in the first path for directly sweeping the light beam across the symbol, and in the second path for directly receiving the reflected light over a field of view across the symbol; and e) a light collector integral with the support component and having a reflective surface for directly collecting the reflected light received by the scan mirror, and for directing the collected light toward the sensor.

2. The module of claim 1, wherein the board is a printed circuit board.

3. The module of claim 1; and further comprising a beam-folding element integral with the light collector, and operative for directing the light beam along a second direction parallel to the board to the scan mirror.

4. The module of claim 3, wherein the scan mirror is angled relative to the board, for directing the light beam directed by the beam-folding element in a third direction perpendicular to the second direction and through the window.

5. The module of claim 4, wherein the beam-folding element and the light collector are of one-piece molded construction with the support component.

6. The module of claim 3, wherein the light collector has an aperture through which passes the light beam directed by the beam-folding element.

7. The module of claim 1; and further comprising a drive for reciprocally oscillating the scan mirror at a rate more than one hundred times per second, the drive including a leaf spring connected to the scan mirror.

8. The module of claim 7, wherein the scan mirror has a center of mass and is connected to the drive at an attachment point spaced from the center of mass.

9. The module of claim 1, wherein the light source is a semiconductor laser having an upwardly-facing opening through which the light beam passes, and wherein the sensor is a photodiode having an upwardly-facing opening through which the collected light passes.

10. The module of claim 1, wherein the module occupies a spatial volume not greater than 21 mm×15 mm×12 mm.

11. The module of claim 1, wherein the component has opaque walls bounding the compartment for the sensor.

12. The module of claim 1, wherein the module has a generally parallelepiped structure.

13. The module of claim 1; and further comprising a hand-held housing on which the window is mounted, and wherein the scan module is mounted within the housing.

14. The module of claim 1, wherein the light collector is concavely curved.

* * * * *